United States Patent
Salamon et al.

(10) Patent No.: US 11,023,605 B1
(45) Date of Patent: Jun. 1, 2021

(54) DATA ACCESS THREAT DETECTION AND PREVENTION

(71) Applicant: EMC IP HOLDING COMPANY LLC, Hopkinton, MA (US)

(72) Inventors: Victor Salamon, Edmonton (CA); John Afaganis, Fort Saskatchewan (CA)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 15/492,485

(22) Filed: Apr. 20, 2017

(51) Int. Cl.
*G06F 21/62* (2013.01)
*G06F 3/06* (2006.01)
*G06F 21/55* (2013.01)

(52) U.S. Cl.
CPC ........ *G06F 21/6218* (2013.01); *G06F 3/0622* (2013.01); *G06F 3/0653* (2013.01); *G06F 3/0689* (2013.01); *G06F 21/55* (2013.01); *G06F 2221/034* (2013.01)

(58) Field of Classification Search
CPC .... G06F 21/6218; G06F 21/55; G06F 3/0653; G06F 3/0622; G06F 3/0689
See application file for complete search history.

(56) References Cited

U.S. PATENT DOCUMENTS

| | | | |
|---|---|---|---|
| 7,930,487 B1* | 4/2011 | Faibish | G06F 21/805 711/147 |
| 2005/0262400 A1* | 11/2005 | Nadeau | G11B 20/1883 714/42 |
| 2012/0124663 A1* | 5/2012 | Russo | G06F 21/33 726/19 |
| 2014/0020083 A1* | 1/2014 | Fetik | G06F 21/552 726/11 |
| 2015/0143183 A1* | 5/2015 | Ogawa | G06F 11/0727 714/48 |
| 2016/0259675 A1* | 9/2016 | Ninose | G11C 29/76 |
| 2016/0378691 A1* | 12/2016 | Sherman | G06F 21/57 711/163 |
| 2017/0286209 A1* | 10/2017 | Heroor | G06F 11/0793 |

* cited by examiner

*Primary Examiner* — Nelson S. Giddins
(74) *Attorney, Agent, or Firm* — Anderson Gorecki LLP

(57) ABSTRACT

Data access threat detection and prevention modules are implemented proximate to data storage, e.g. in disk array controllers. The modules may be implemented in hardware or firmware. The modules monitor IOs from the disk array controllers to access managed drives. IOs exhibiting access parameters that deviate from a whitelist or match a blacklist are deemed to be suspicious. The whitelist may be created from monitoring normal, safe IOs and storing associated access patterns. In response to detection of suspicious activity the modules may halt or slow subsequent IOs, e.g. IOs to the same data, all data, an associated logical device, or the managed drive.

16 Claims, 3 Drawing Sheets

DATA ACCESS THREAT DETECTION AND PREVENTION

BACKGROUND

The subject matter of this disclosure is generally related to computer networks in which a data storage system is used to maintain data for multiple host servers and many concurrent users. The host servers may run host applications such as a database, file server or block server, for example and without limitation. The data storage system may include one or more storage arrays, each of which may include a plurality of interconnected computing nodes. The computing nodes manage access to host application data stored on tangible data storage devices such as disk drives and flash drives.

SUMMARY

All examples, aspects and features mentioned in this document can be combined in any technically possible way.

In accordance with an aspect an apparatus comprises: a storage array comprising: a plurality of computing nodes, each of the computing nodes comprising at least one processor and non-transitory memory; a plurality of disk arrays, each disk array comprising a plurality of data storage drives, each disk array connected with one of the computing nodes; and at least one data access threat detector that monitors data access communications transmitted from ones of the computing nodes to ones of the disk arrays and detects suspicious data access based on analysis of the data access communications. Some implementations further comprise a plurality of disk array controllers, each disk array controller connected between one of the computing nodes and one of the disk arrays, each disk array controller comprising one of the data access threat detectors. In some implementations each managed drive comprises one of the data access threat detectors. In some implementations each disk array controller comprises a processor, and each data access threat detector is implemented in firmware via which the processor connects to ones of the managed drives. In some implementations each data access threat detector monitors IOs from the processor of the disk array controller in which that data access threat detector is implemented and stores access parameters associated with the monitored IOs. In some implementations the suspicious data access is characterized by one or more of data content transforming from ASCII to binary at a rate larger than a predetermined value; indications of a ransomware attack; association with access over a predetermined contiguous range; read access indicating theft; write access indicating erasure; accesses (read or write) larger than a predetermined value or smaller than a predetermined value; accesses occurring at an unusual time; accesses exhibiting a predetermined duration between the accesses; accesses exhibiting a predetermined frequency between the accesses; and access to restricted block range at a frequency greater than a predetermined value. In some implementations the stored access parameters comprise a whitelist. In some implementations the access parameters comprise at least one of number of blocks accessed by each IO, time duration between IOs, and frequency at which blocks are accessed. In some implementations the suspicious data access is detected based on deviation from the whitelist of stored data access parameters. In some implementations the suspicious data access is detected based on matching stored access parameters with a blacklist of data access parameters.

In accordance with an aspect a method comprises: in a storage array comprising: a plurality of computing nodes, each of the computing nodes comprising at least one processor and non-transitory memory, and a plurality of disk arrays, each disk array comprising a plurality of data storage drives, each disk array connected with one of the computing nodes: monitoring data access communications transmitted from ones of the computing nodes to ones of the disk arrays; and detecting suspicious data access based on analysis of the data access communications. In some implementations the storage array includes a plurality of disk array controllers, each disk array controller connected between one of the computing nodes and one of the disk arrays, and comprising monitoring the data access communications in each disk array controller and detecting the suspicious data access based on analysis of the data access communications. Some implementations comprise monitoring the data access communications in each managed drive and detecting the suspicious data access based on analysis of the data access communications. In some implementations each disk array controller includes a processor, and comprising monitoring data access with firmware via which the processor connects to ones of the managed drives. Some implementations comprise monitoring IOs from the processor of the disk array controller in which the firmware is implemented and storing access parameters associated with the monitored IOs. Some implementations comprise detecting the suspicious access characterized by one or more of data content transforming from ASCII to binary at a rate larger than a predetermined value; indications of a ransomware attack; association with access over a predetermined contiguous range; read access indicating theft; write access indicating erasure; accesses (read or write) larger than a predetermined value or smaller than a predetermined value; accesses occurring at an unusual time; accesses exhibiting a predetermined duration between the accesses; accesses exhibiting a predetermined frequency between the accesses; and access to restricted block range at a frequency greater than a predetermined value. Some implementations comprise analyzing the data access communications by comparing monitored IOs with stored access parameters. Some implementations comprise storing at least one of number of blocks accessed by each IO, time duration between IOs, and frequency at which blocks are accessed. Some implementations comprise detecting the suspicious data access based on deviation from a whitelist of stored data access parameters. Some implementations comprise detecting the suspicious data access based on matching stored access parameters with a blacklist of data access parameters.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Threat detection software is sometimes implemented in data centers and communications networks in which host applications run on host computers and host application data is maintained on a storage array. For example, threat detection software may monitor storage array access logs for suspicious activity. A shortcoming of that technique is that a malicious user who gains administrator privileges to the storage array can hide unauthorized access and malicious activity by pausing or crashing the logging system, or deleting or altering the logs. The technique also fails to protect against direct access attacks using the storage array's data access protocol (SCSI, for example) to bypass authentication procedures and access logs. Further, manual intervention may be required in order to protect against a detected threat if the threat detection software is not designed to implement protective counter-measures in response to suspicious activity. Manual intervention may be relatively slow to implement.

Figure 1:
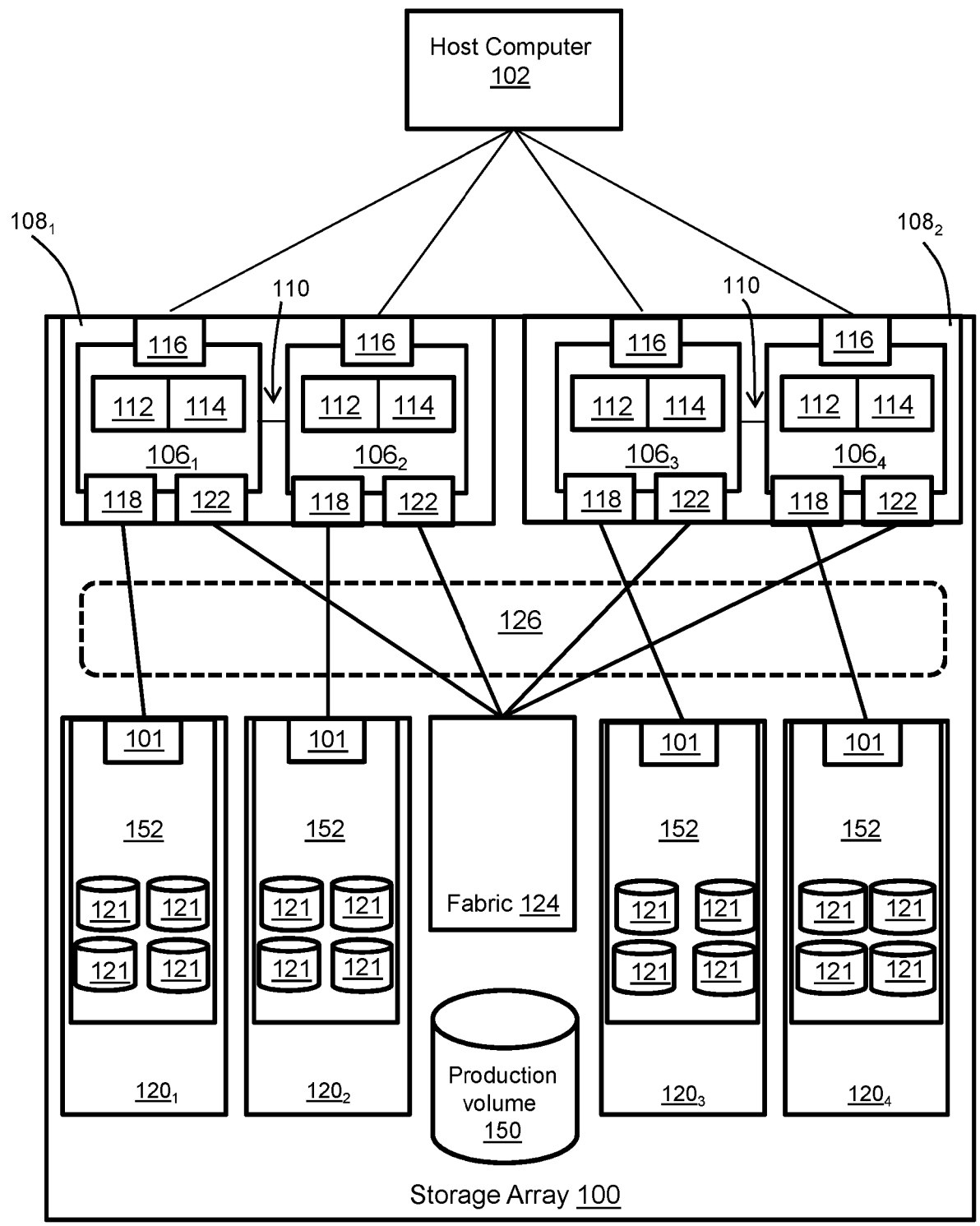
FIG. 1 illustrates a storage array with data access threat detection and prevention modules.

FIG. 1 illustrates a storage array 100 with data access threat detection and prevention modules 101. The illustrated storage array is only one example of a wide variety of storage arrays in which the data access threat detection and prevention modules could be implemented. The storage array 100 includes a plurality of computing nodes $106_1$-$106_4$. Pairs of the computing nodes ($106_1$, $106_2$) and ($106_3$, $106_4$) may be organized as storage engines $108_1$, $108_2$, respectively, for purposes of failover. The paired computing nodes of each storage engine may be directly interconnected by communication links 110. Each computing node includes at least one tangible multi-core processor 112 and a local cache 114. The local cache may include, for example and without limitation, volatile memory components such as RAM (random access memory) and non-volatile memory components such as high performance SSDs (solid state devices). Each computing node may also include one or more CAs (channel directors, aka channel adapters) 122 for communicating with other computing nodes via an interconnecting fabric 124. Each computing node may allocate a portion or partition of its respective local cache 114 to a virtual shared cache 126 that can be accessed by other computing nodes, e.g. via DMA (direct memory access) or RDMA (remote direct memory access). Each computing node may include one or more FEs 116 (front-end directors, aka front end adapters) for communicating with a host computer 102. Each computing node $106_1$-$106_4$ may also include one or more BEs 118 (back end directors, aka back end adapters) for communicating with disk arrays $120_1$-$120_4$.

The disk arrays $120_1$-$120_4$ include managed drives 121 that are accessed via disk array controllers 152, of which there may be more than one. The managed drives 121 may include tangible storage devices of one or more technology types, for example and without limitation SSDs (solid state devices) such as flash, and HDDs (hard disk drives) such as SAS (serial attached SCSI), SATA (Serial Advanced Technology Attachment) and FC (Fibre Channel). In order to access the managed drives the BEs 118 communicate with a respective disk array controller 152 with which the BE is connected. Each disk array controller 152 is a hardware device that manages access to the managed drives 121 and presents the storage space of the managed drives to the connected computing node as one or more logical units of storage. Each disk array controller may implement RAID and may include a processor and volatile memory. The managed drives and associated disk array controller may be located within the same physical enclosure, e.g. chassis, which may be locked, sealed or otherwise made tamper-proof or tamper-resistant.

The computing nodes $106_1$-$106_4$ create and maintain a logical production volume 150 for a host application running on the host computer 102. Without limitation, the production volume 150 may be referred to as a production device, production LUN or host LUN, where LUN (logical unit number) is a number used to identify the logical storage volume in accordance with the SCSI (small computer system interface) protocol. The production volume 150 represents an abstraction layer between the managed drives 121 and the host computer 102, of which there may be many in a cluster. From the perspective of the host computer the production volume 150 is a single data storage device having a set of contiguous fixed-size LBAs (logical block addresses) on which data used by a host application resides. However, the data used by the host application may actually be maintained by the computing nodes at non-contiguous addresses on various different managed drives 121 as managed by the disk array controller. In response to an IO from the host computer 102 the receiving computing node temporarily places data for servicing IOs associated with the production volume 150 into the shared cache 126. For example, the computing node may communicate with the disk array controller in order to copy the data from the managed drives into the shared cache. The shared cache 126 may enable the production volume 150 to be reachable via all of the computing nodes and paths, although the storage array can be configured to limit use of certain paths to certain logical volumes. For example, the production volume 150 may be configured to be accessible via only a subset of FAs 116.

In the illustrated example the data access threat detection and prevention modules 101 are implemented in the disk array controllers 152. This creates a login/access gap between an attacker and the data that the attacker is trying to maliciously access, i.e. the data on the managed drives 121. Even if the attacker is able to login to the host computer or one of the computing nodes with administrator privileges or attempt to gain direct access to data via the storage array data access protocol, such malicious data access will still be subject to detection via monitoring of data access by the data access threat detection and prevention modules 101 running on the disk array controllers 152. Moreover, in order to attempt to bypass the disk array controller and reach the managed drives it would be necessary to physically open the tamper-resistant or tamper-proof enclosure in which both the disk array controller and associated managed drives are located.

Figure 2:
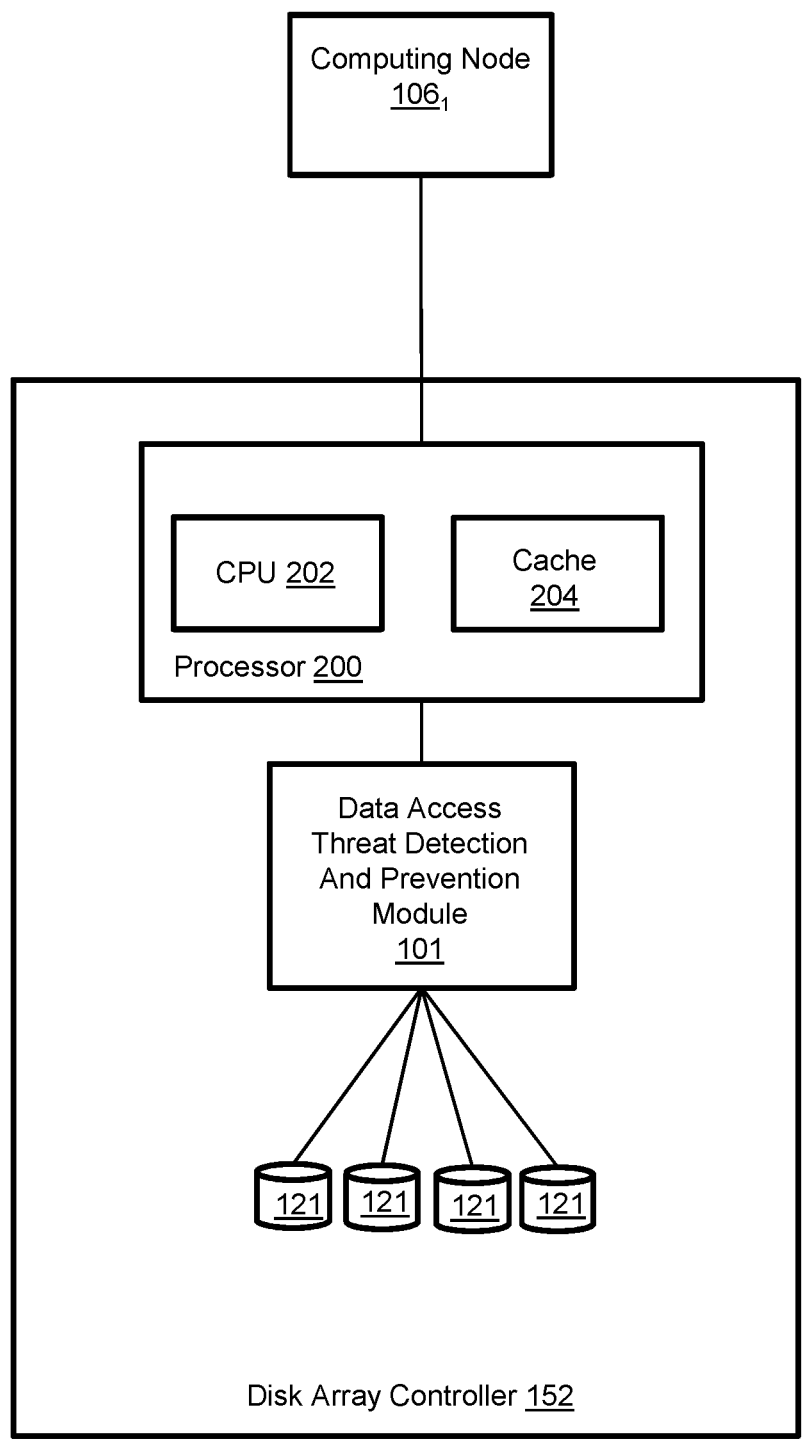
FIG. 2 illustrates the disk array controller in greater detail.

FIG. 2 illustrates one of the disk array controllers 152 in greater detail. The disk array controller includes a processor 200 and the data access threat detection and prevention module 101. The processor 200 includes a CPU (central processing unit) 202 and cache 204. The data access threat detection and prevention module may be implemented in hardware or firmware via which the processor 200 connects to the managed drives 121. In response to an access request, e.g. a SCSI command, from the computing node 106₁, the processor 200 determines which managed drives and addresses correspond to the access request. The access request could be, for example and without limitation, at the block, storage object or file level. The processor 200 then sends one or more IOs to the managed drives via the data access threat detection and prevention module in order to implement the access request, e.g. to read or write data. The data access threat detection and prevention module 101 monitors the IOs from the processor 200 to the managed drives and analyzes the IOs to detect threats and deter activity that is determined to violate access rules. As will be explained below, subsequent IOs may be delayed or prevented in response to detection of suspicious data access activity. For example, the data access threat detection and prevention module may prevent IOs from reaching the managed drives or buffer IOs such that IOPS (IOs per second) serviced by the managed drives decreases.

Figure 3:
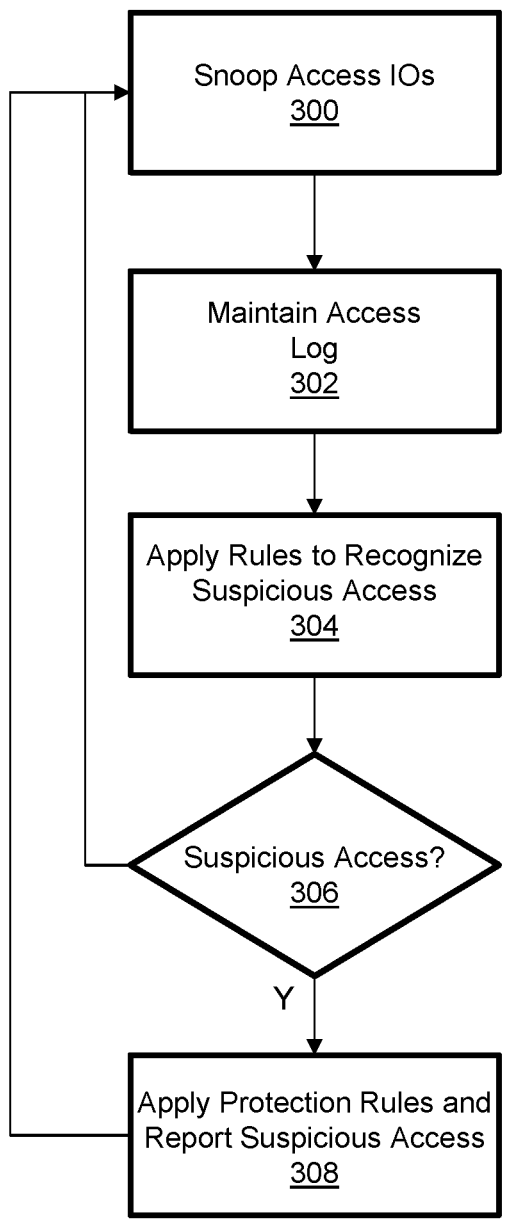
FIG. 3 is a flow diagram that illustrates operation of the data access threat detection and prevention modules.

FIG. 3 is a flow diagram that illustrates operation of the data access threat detection and prevention module. The data access threat detection and prevention module monitors the IOs sent from the disk array controller processor to the managed drives as indicated in block 300. For example, the data access threat detection and prevention module may snoop and copy portions of the IOs for analysis. The data access threat detection and prevention module uses the copied information to create and maintain an access log as indicated in block 302. The access log may be maintained as a database, for example and without limitation. Copied information that is recorded in the access log may include the number of blocks accessed by each request, time duration between access requests, and the frequency at which blocks are accessed. Assuming that the access log is populated before an attack occurs, the access patterns represented in the access log and database represent safe, normal access patterns, e.g. a whitelist. However, a predefined whitelist could be loaded into memory. The data access threat detection and prevention module applies rules to the access parameters of incoming IOs, e.g. in real time, to recognize suspicious access activity as indicated in block 304. In some implementations the access parameters of the incoming IOs are compared with the whitelist patterns, e.g. the parameters in the access log. If the incoming IOs exhibit parameters that deviate from the whitelisted access pattern parameters, e.g. by more than a predetermined margin, then suspicious activity is deemed to have been detected. In some implementations the access parameters of the incoming IOs are compared with a blacklist of suspicious patterns. If the incoming IOs exhibit parameters that match blacklisted access pattern parameters then suspicious activity is deemed to have been detected. If suspicious activity is deemed to have been detected as determined in block 306 then the data access threat detection and prevention module applies protection rules and generates a report of the detected suspicious access as indicated in block 308. The report may be sent to a security administrator. The protection rules may include, for example and without limitation, sending a command to the disk array controller processor to stop or slow IOs to specific data or all data.

The database of access parameters for detecting suspicious activities would be specific to the application that is accessing the disk array. Suspicious activities may be identified as any workload that is unexpected for the application and that is using data (at the block, object or file system level) that satisfies one of the following conditions: the content of the data transforms from predominantly ASCII to binary at a rate larger than a predetermined value Z; indicates a ransomware attack; is associated with access over a large contiguous range (of blocks, objects or files); read access indicating theft; write access indicating erasure; accesses (read or write) larger than a predetermined value X or smaller than a predetermined value Y; the application is functioning in an unexpected way; access at unusual times (night or during maintenance window); predetermined duration between accesses; or predetermined frequency between accesses. In the specific case of block access a condition that may indicate suspicious activity is access to restricted (where file systems keep metadata, ex. FAT) block range is at frequency higher than a predetermined value X.

An additional layer of security may be implemented by using independent access control and authentication for managing the data access threat detection and prevention modules and associated logs, databases, rules, blacklists, and whitelists. An override through the additional layer of security may be implemented for special maintenance, and/or pre-planned during maintenance windows. Further, the data access threat detection and prevention modules could be implemented in the disk drives and in the BEs.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a block-based storage array that stores data for a plurality of host computers without knowledge of file-level data structures, comprising:
   a plurality of computing nodes that perform authentication and process data access commands from ones of the host computers to logical block addresses of a logical production volume, each of the computing nodes comprising at least one processor and non-transitory memory;
   a plurality of disk arrays that are undiscoverable by the host computers, each disk array comprising a plurality of data storage drives, each disk array connected with one of the computing nodes and storing production volume data; and
   a plurality of disk array controllers, each disk array controller connected between one of the computing nodes and one of the disk arrays such that the disk array cannot be accessed by bypassing the disk array controller, and configured to detect malicious data access threats without reliance on authentication, each disk array controller comprising at least one malicious data access threat detector that monitors data access communications transmitted from ones of the computing nodes to ones of the disk arrays, detects suspicious data access based on analysis of the data access communications wherein the suspicious data access is perpetrated by a malicious user who has already been authenticated by one of the computing nodes or who has already bypassed authentication procedures of one of the computing nodes, the suspicious data access characterized by one or more of:
- block access exceeding a predetermined contiguous range;
- block read access indicating theft;
- block write access indicating erasure;
- block accesses (read or write) larger than a predetermined value or smaller than a predetermined value;
- block accesses occurring at an unusual time;
- block accesses exhibiting a predetermined duration between the accesses;
- block accesses exhibiting a predetermined frequency between the accesses; and
- access to a restricted block range at a frequency greater than a predetermined value, and applies protection rules in response to detection of suspicious data access.

2. The apparatus of claim 1 wherein each managed drive comprises one of the data access threat detectors.

3. The apparatus of claim 1 wherein each disk array controller comprises a processor, and wherein each data access threat detector is implemented in firmware via which the processor connects to ones of the managed drives.

4. The apparatus of claim 3 wherein each data access threat detector monitors IOs from the processor of the disk array controller in which that data access threat detector is implemented and stores access parameters associated with the monitored IOs.

5. The apparatus of claim 4 wherein the stored access parameters comprise a whitelist of non-suspicious access parameters.

6. The apparatus of claim 5 wherein the suspicious data access is detected based on deviation from the whitelist of stored data access parameters.

7. The apparatus of claim 4 wherein the access parameters comprise at least one of number of blocks accessed by each IO, time duration between IOs, and frequency at which blocks are accessed.

8. The apparatus of claim 4 wherein the suspicious data access is detected based on matching stored access parameters with a blacklist of suspicious data access parameters.

9. A method comprising:
in a block-based storage array that stores data for a plurality of host computers without knowledge of file-level data structures, comprising a plurality of computing nodes that perform authentication and process data access commands from ones of the host computers to logical block addresses of a logical production volume, each of the computing nodes comprising at least one processor and non-transitory memory, and a plurality of disk arrays that are undiscoverable by the host computers, each disk array comprising a plurality of data storage drives, each disk array connected with one of the computing nodes and storing production volume data:
- monitoring data access communications transmitted from ones of the computing nodes to ones of the disk arrays using a disk array controller connected between one of the computing nodes and one of the disk arrays such that the disk array cannot be accessed by bypassing the disk array controller;
- detecting suspicious data access without reliance on authentication based on analysis of the data access communications wherein the suspicious data access is perpetrated by a malicious user who has already been authenticated by one of the computing nodes or who has already bypassed authentication procedures of one of the computing nodes, and detecting the suspicious data access based on at least one characteristic selected from the group consisting of:
  - block access exceeding a predetermined contiguous range;
  - block read access indicating theft;
  - block write access indicating erasure;
  - block accesses (read or write) larger than a predetermined value or smaller than a predetermined value;
  - block accesses occurring at an unusual time;
  - block accesses exhibiting a predetermined duration between the accesses;
  - block accesses exhibiting a predetermined frequency between the accesses; and
  - access to a restricted block range at a frequency greater than a predetermined value; and
- applying protection rules in response to detection of suspicious data access.

10. The method of claim 9 comprising monitoring the data access communications in each managed drive and detecting the suspicious data access based on analysis of the data access communications.

11. The method of claim 9 wherein each disk array controller includes a processor, and comprising monitoring data access with firmware via which the processor connects to ones of the managed drives.

12. The method of claim 11 comprising monitoring IOs from the processor of the disk array controller in which the firmware is implemented and storing access parameters associated with the monitored IOs.

13. The method of claim 9 comprising analyzing the data access communications by comparing monitored IOs with stored access parameters.

14. The method of claim 13 comprising storing at least one of number of blocks accessed by each IO, time duration between IOs, and frequency at which blocks are accessed.

15. The method of claim 13 comprising detecting the suspicious data access based on deviation from a whitelist of non-suspicious access parameters.

16. The method of claim 13 comprising detecting the suspicious data access based on matching stored access parameters with a blacklist of suspicious access parameters.

* * * * *